US008254390B2

(12) United States Patent
Hall et al.

(10) Patent No.: US 8,254,390 B2
(45) Date of Patent: Aug. 28, 2012

(54) COMPACT LOAD BALANCED SWITCHING STRUCTURES FOR PACKET BASED COMMUNICATION NETWORKS

(75) Inventors: Trevor Hall, Ottawa (CA); Sofia Paredes, Ottawa (CA); Sareh Taebi, Ottawa (CA)

(73) Assignee: Trevor Hall, Ottawa, Ontario ( * ) Notice: Subject to any disclaimer, the term of this patent is extended or adjusted under 35 U.S.C. 154(b) by 1005 days.

(21) Appl. No.: 11/793,298

(22) PCT Filed: Dec. 19, 2005

(86) PCT No.: PCT/CA2005/001913
§ 371 (c)(1),
(2), (4) Date: Jun. 27, 2008

(87) PCT Pub. No.: WO2006/063459
PCT Pub. Date: Jun. 22, 2006

(65) Prior Publication Data
US 2008/0267204 A1    Oct. 30, 2008

Related U.S. Application Data

(60) Provisional application No. 60/636,485, filed on Dec. 17, 2004.

(51) Int. Cl.
*H04L 12/56* (2006.01)
*H04L 12/54* (2006.01)
(52) U.S. Cl. .................. 370/394; 370/401; 370/429
(58) Field of Classification Search .................. None
See application file for complete search history.

(56) References Cited

U.S. PATENT DOCUMENTS

| | | | | |
|---|---|---|---|---|
| 6,907,041 | B1 * | 6/2005 | Turner et al. | 370/388 |
| 6,982,975 | B1 * | 1/2006 | Aramaki et al. | 370/388 |
| 7,397,794 | B1 * | 7/2008 | Lacroute et al. | 370/388 |
| 7,586,909 | B1 * | 9/2009 | Walrand et al. | 370/388 |
| 7,672,301 | B2 * | 3/2010 | Klausmeier et al. | 370/388 |
| 2002/0039362 | A1 * | 4/2002 | Fisher et al. | 370/387 |
| 2003/0133465 | A1 | 7/2003 | Alfano | |
| 2004/0131068 | A1 | 7/2004 | Korber et al. | |

FOREIGN PATENT DOCUMENTS

| | | |
|---|---|---|
| EP | 0884876 A1 | 12/1998 |
| WO | WO2004/006517 A1 | 1/2004 |

OTHER PUBLICATIONS

EPO/SR, "Supplementary European Search Report", dated Oct. 5, 2009, pp. 1 to 4.
Awdeh, Ra'ed Y. et al., "Survey of ATM switch architectures", pp. 1567-1613, XP004002747 ISSN:0169-7552, vol. 27, No. 12, , Nov. 1, 1995, Computer Networks and ISDN Systems, North Holland Publishing, Amsterdam, NL. Wong, P.C. et al., "A Large Scale Packet Switch Interconnection Architecture using Overflow Switches", Proceedings of the International Conference on Communications (ICC), Geneva, May 23-26, 1993; Proceedings of the International Conference on Communications (ICC), New York, IEEE, US, vol. 2, May 23, 1993, pp. 708-714, XP010137070 ISBN:978-0-7803-0905-0.
Clos, C., "A Study of Non-Blocking Switching Networks", pp. 406-424, XP000605046, vol. 32, Mar. 1, 1953, Bell System Technical Journal, American Telephone and Telegraph Co., New York, US.

* cited by examiner

*Primary Examiner* — Gregory Sefcheck
*Assistant Examiner* — Joshua Smith
(74) *Attorney, Agent, or Firm* — Freedman & Associates (57) ABSTRACT

A switching node is disclosed for the routing of packetized data employing a multi-stage packet based routing fabric combined with a plurality of memory switches employing memory queues. The switching node allowing reduced throughput delays, dynamic provisioning of bandwidth and packet prioritization.

6 Claims, 7 Drawing Sheets

COMPACT LOAD BALANCED SWITCHING STRUCTURES FOR PACKET BASED COMMUNICATION NETWORKS

This application claims the benefit of U.S. Provisional Application No. 60/636,485, filed Dec. 17, 2004.

FIELD OF THE INVENTION

The invention relates to the field of communications and more particularly to a scaleable architecture for packet based communication networking.

BACKGROUND OF THE INVENTION

Telecommunications networks have evolved from the earliest networks having few users with plain old telephone service (POTS) to networks in operation today interconnecting hundreds of millions of users with a wide variety of services including for example telephony, Internet, streaming video, and MPEG music. Central to these networks is the requirement for a switching fabric allowing different users to be connected either together or to a service provider. Supporting an increase in a number of users, connections and bandwidth are networks based upon segmentation, transmission, routing, detection and reconstruction of a signal. The segmentation results in a message being divided into segments—referred to as packets, and such networks being packet switched networks.

From a viewpoint of users, this process is transparent provided that the telecommunications network acts in a manner such that the packetization, and all other processes occur in a manner such that the user has available the services and information as required and "on demand." The users perception of this "on demand" service varies substantially depending upon the service used. For example, when downloading most information via the Internet, a small delay is acceptable for text and photographs but not for streamed video unless sufficient memory buffer exists. Amongst the most sensitive services is telephony as the human perception of delay in voice is extremely acute. The result is that network providers prioritize packets according to information content, priority information included as part of the header of a packet.

The switching fabric of current telecommunications packet networks is a massive mesh of large electronic cross-connect switches interconnected generally by very high speed optical networks exploiting dense wavelength division multiplexing to provide interconnection paths offering tens of gigabit per second transmission. Within this mesh are a limited number of optical switches which generally provide protection switching and relatively slow allocation of bandwidth to accommodate demand.

But the demands from users for increased services, increased bandwidth and flexible services are causing the network operators to seek an alternative architecture. The alternative is "agile" networks which are widely distributed implementations of packet switching, as necessary to provide dynamic routing/bandwidth very close to users and with rapidly shifting patterns as they access different services. Agility to the network operators implies the ability to rapidly deploy bandwidth on demand at fine granularity. Helping them in this is the evolution of access networks which have to date been electrical at rates up to a few megabits per second but are now being replaced with optical approaches (often referred to as fiber-to-the-home or FTTH) with data rates of tens to hundreds of megabits per second to customers, and roadmaps to even gigabit rates per subscriber.

As the network evolves, and services become more flexible and expansive, speeds increase such that the network provider is increasingly focused to three problems:

Delay—the time taken to route packets across the network, where excessive delay in any single packet of a message prevents the message being completed Mis-Sequencing—the mis-sequencing of packets through the network causes delays at the user as until the mis-sequenced packet arrives the message cannot be completed Losses—the loss of packets due to blocked connections within the network causes delays as the lost packets must be retransmitted across the network.

It is therefore desirable within the network to address these issues with a physical switching fabric. The invention disclosed provides such an architecture for the distributed packet switching wherein the fabric acts to balance the traffic load on different paths and network elements within the distributed packet switch. In doing so the disclosed invention removes additionally the requirement for rapid reconfiguration of the packet switches, which has the added benefit of allowing the deployment of optical switches within the network which are slower and smaller than their electrical counterparts.

SUMMARY OF THE INVENTION

In accordance with the invention there is provided a switching node in respect of routing data packets arriving at the switching node within a communications network. The switching node contains a plurality of input ports each of which receives data packets addressed to it from the broader communications network. Within the switching node are multiple memory switches which are implemented by a combination of a plurality of memory queues, for storing the packet data therein, coupled to a first switch matrix for switching of packet data for storage within a memory queue of the plurality of first memory queues, and a second switch matrix for switching of packet data retrieved from within a memory queue of the plurality of first memory queues.

The multiple memory switches are then coupled to a third switching matrix, which is coupled on one side to the plurality of input ports and the plurality of memory switches on the other. The multiple memory switches are then coupled to a fourth switching matrix coupled such that on the one side are the plurality of memory switches and on the other the plurality of output ports.

At least one of the third or fourth switching matrix is implemented with a second set of multiple memory queues which are coupled between a fifth switch matrix and sixth switch matrix. In this invention the packets of data arriving at the switching node are sequenced within the memory queues and memory switches with the packets of data then being routed appropriately between the input and outputs using the multiple switching matrices.

As a result the switching node can meet all of the demands of the network provider in terms of quality of service, flexibility of provisioning to a users varied demands for services, and prioritizing packet data switching based upon predetermined priorities of the packets and the dynamic bandwidth allocation between input and output ports. The control approach allows this to be achieved in an architecture where the loading of activities such as switching, memory queuing etc is balanced across the node.

In another embodiment of the invention the use of multiple memory queues and memory switches allows the switching node to store packet data having a lower priority in an earlier stage of the multi-stage memory queue. Additionally the matrices coupled to the memory queues may be spatial switches, time division multiplexing switches, or a combination thereof.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

Figure 1:
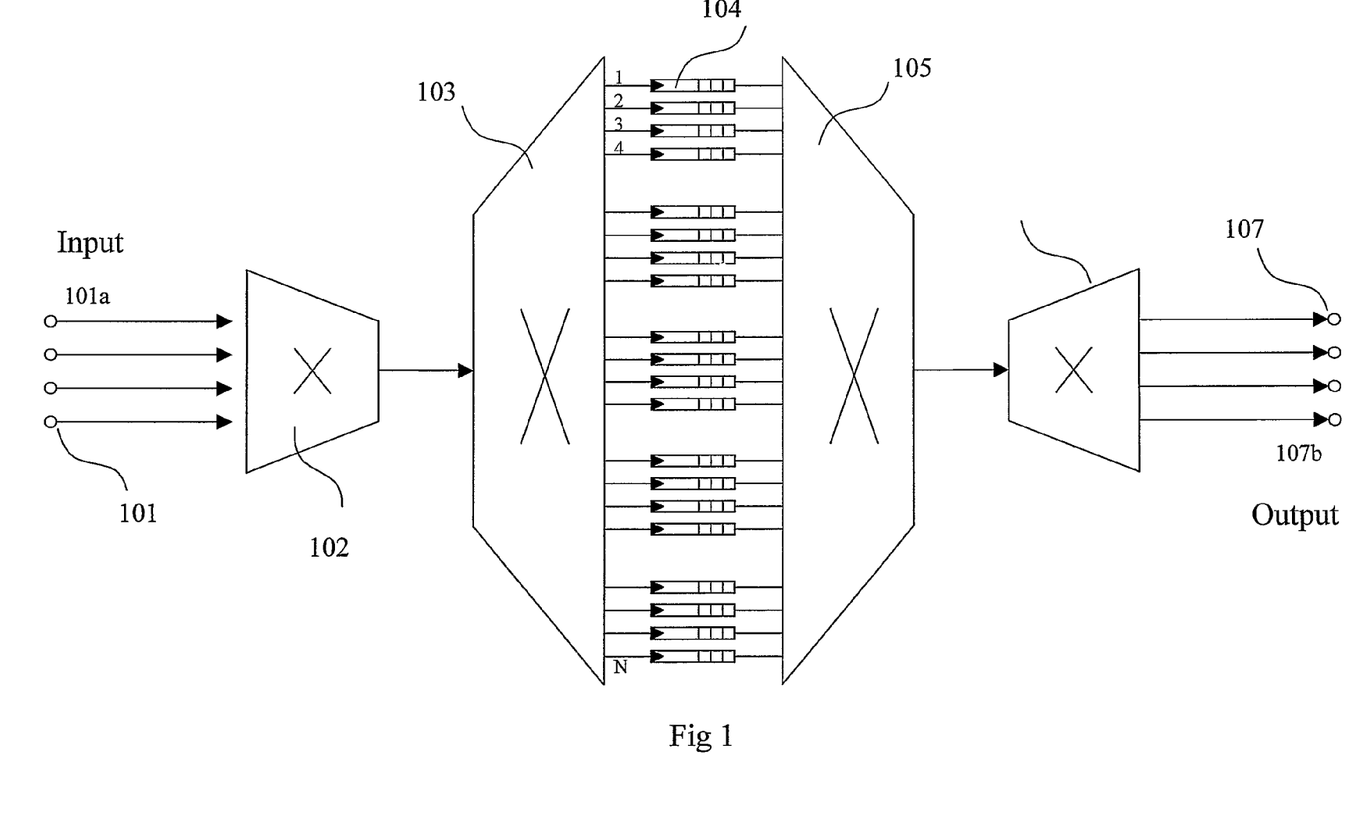
FIG. 1 illustrates a prior art approach to packet switching using a centralized shared memory switch with queues.

Referring to FIG. 1a, shown is a prior art approach to a packet switch using a single stage of memory queues. A plurality of input ports 101 are connected to physical links within a communications network (not shown). These input ports 101 are coupled to an input multiplexer 102, which multiplexes the plurality of input packet data streams to a single data stream. The single data stream is then transported to a 1:N distribution switch 103, which is coupled to N parallel memory queues 104, each memory queue 104 allowing packets of data to be stored until retrieved.

The N parallel memory queues 104 are in turn connected to an N:1 concentrator switch 105 that reads from the memory queues 104. The output data stream of the concentrator switch 105 is then connected to a demultiplexing switch 106 which in turn connects to a plurality of output ports 107.

A packet of data arriving at input port 101a of the switching fabric, being one of the plurality of input ports 101 is multiplexed by the multiplexing switch 102 to the common communications path prior to propagating within the distribution switch 103. The packet of data from input port 101a then propagates to one of the memory queues 104. The packet is then stored prior to being retrieved by the concentrator switch 105 and then being routed by the demultiplexer switch 106 to the appropriate output port 107b, being one of the plurality of output ports 107.

Figure 2:
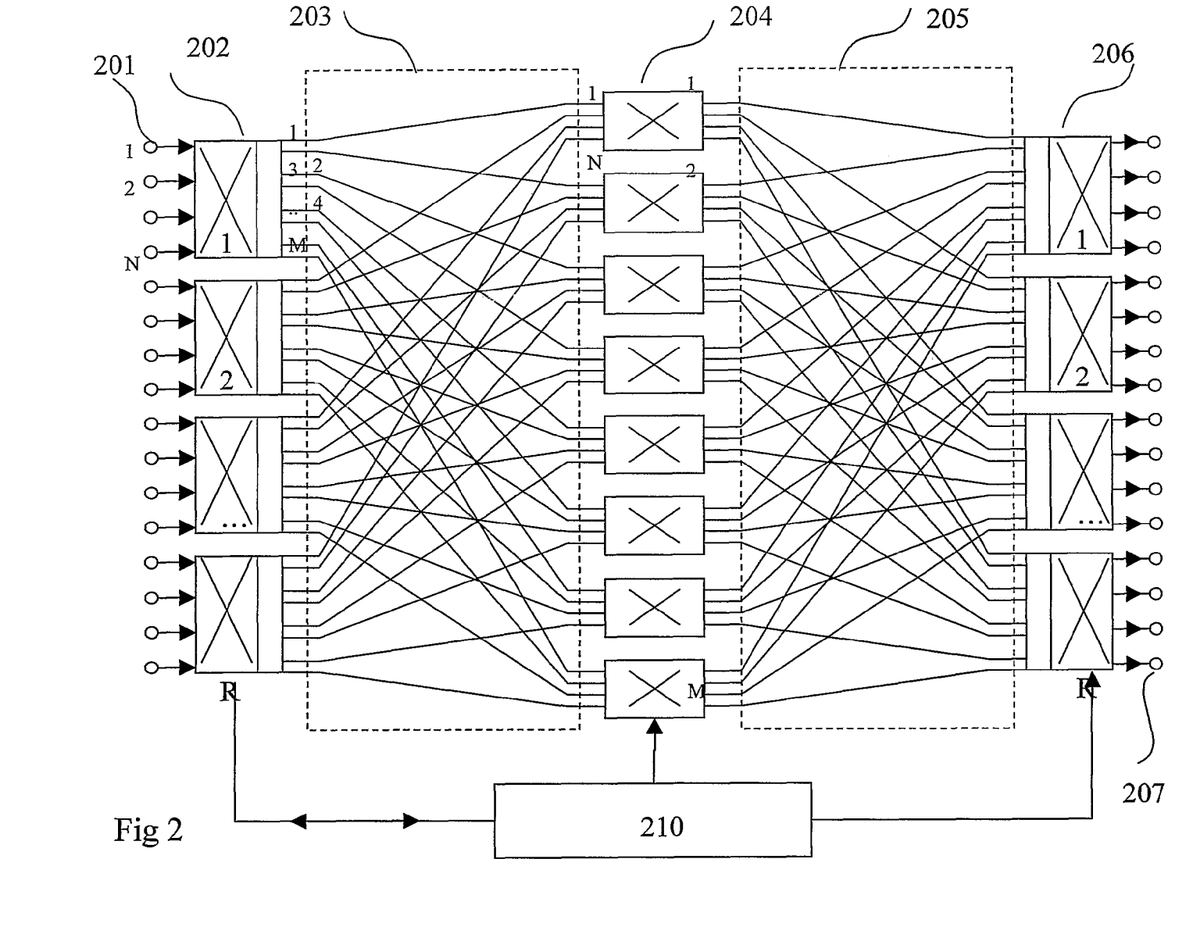
FIG. 2 illustrates a prior art packet switch using a three-stage Close-like network.

Now referring to FIG. 2 shown is a prior art implementation of a packet switch based upon a three-stage Clos architecture. Here a packet of data arrives at one of the N input ports 201 of one of the plurality of first stage routing switches 202. Assuming that there are R such first stage routing matrices 202, each having M output ports, the data received is time-stamped, its header read and an identifier of the target output port communicated to the packet switch controller 210. This determines the routing through the switching node specifically, and causes the packet of data to be routed to the appropriate output port of the first stage routing matrix 201 for transport to the subsequent section of the packet switching node. When transported, the packet of data propagates through a first perfect shuffle network 203 comprising R×M paths, wherein it addresses one of the M second stage switching matrices 204, which are N×N crosspoint switches.

The packet switch controller 210 routes the packet of data within the second stage switching matrix 204 for transport to the third stage switch matrix 206. From the appropriate output port of the second stage switch matrix 204, it is routed via a second perfect shuffle network 205 to the specified third stage switching matrix 206. Within the third stage switching matrix 206, the packet is routed directly to an output port 207 of the switching node and transported via the wider communications network.

Figure 3A:
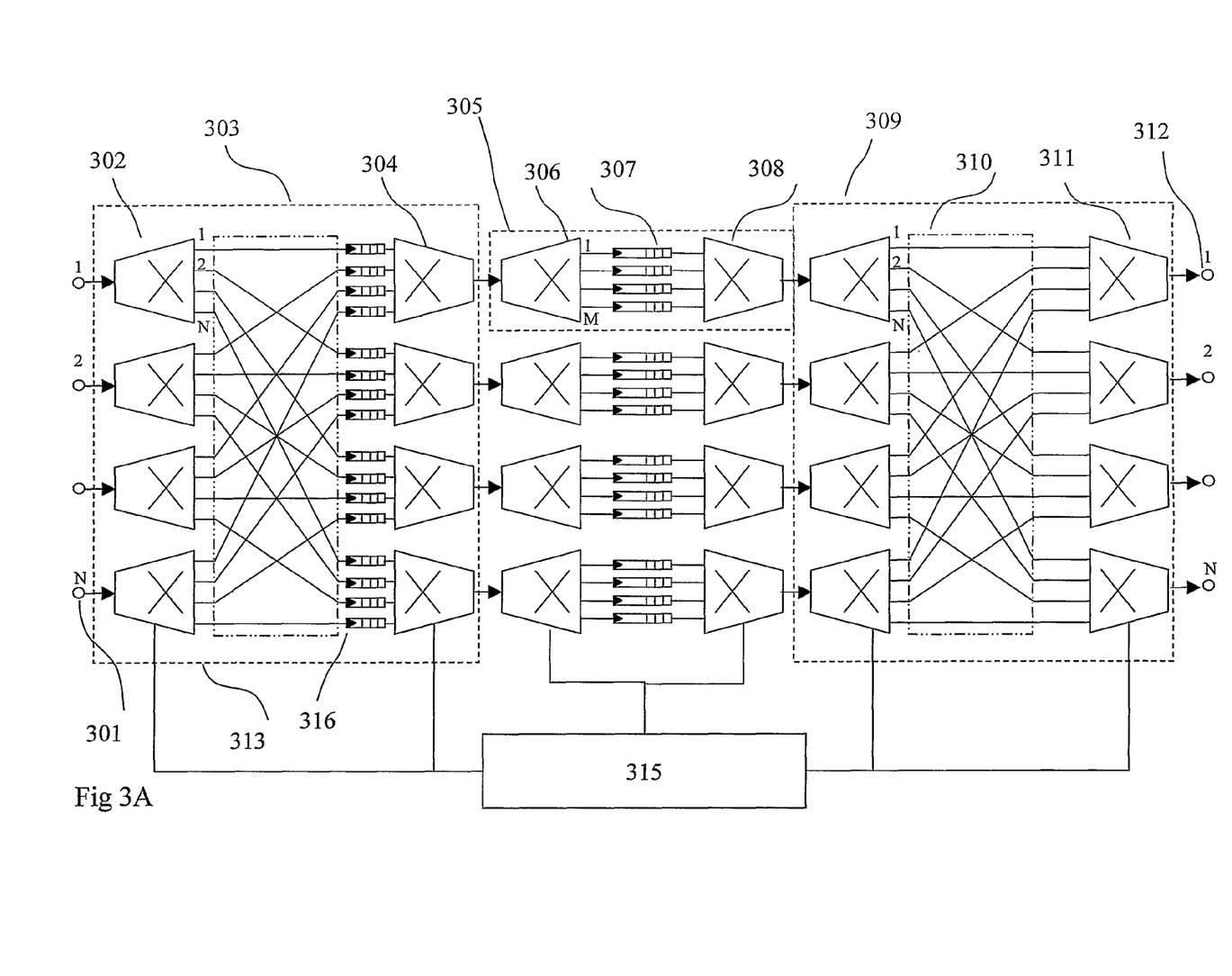
FIG. 3A illustrates a first embodiment of the invention wherein the load-balanced switch is implemented with an input queued crossbar switch with route and select switches.

Referring to FIG. 3A, an exemplary first embodiment of the invention is shown in the form of a compact load balanced crossbar packet switch with queued input ports. Here a packet of data is incident at one of the input ports 301 of the packet switching node. The header of the packet is read and communicated to the packet switching node controller 315 which defines the appropriate routing of the packet through the node. The packet switching controller 315 communicates routing data to the first stage switch matrix 303 comprising a first N×N crossbar switch with memory queues. This is implemented using 1:N distribution switches 302, a perfect shuffle 313, a plurality of memory queues 316 and N:1 concentrator switches 304. The packet of data exits the first stage switching matrix 303 on a link connecting a second stage switch matrix 305 determined by the packet switching node controller 315.

The second stage switch matrix 305 is constructed from 1:M distribution switches 306, M memory queues 307, and M:1 concentrator switches 308. The packet of data is routed by the distribution switch 306 to one of the memory queues 307 wherein it is stored pending extraction under the control of the packet switching node controller 315. When required for transport to the third switching stage 309 of the switching node, the data is extracted from one of the plurality of memory queues 307 and fed forward using the concentrator switch 308.

Upon arrival at the third switch stage 309, the packet of data is routed to an output port using a second N×N crossbar switch implemented again using 1:N distribution switches 310, a perfect shuffle 314 and N:1 concentrator switches 311, whereupon it is available at output port 312 for transport to the wider communications network.

Figure 3B:
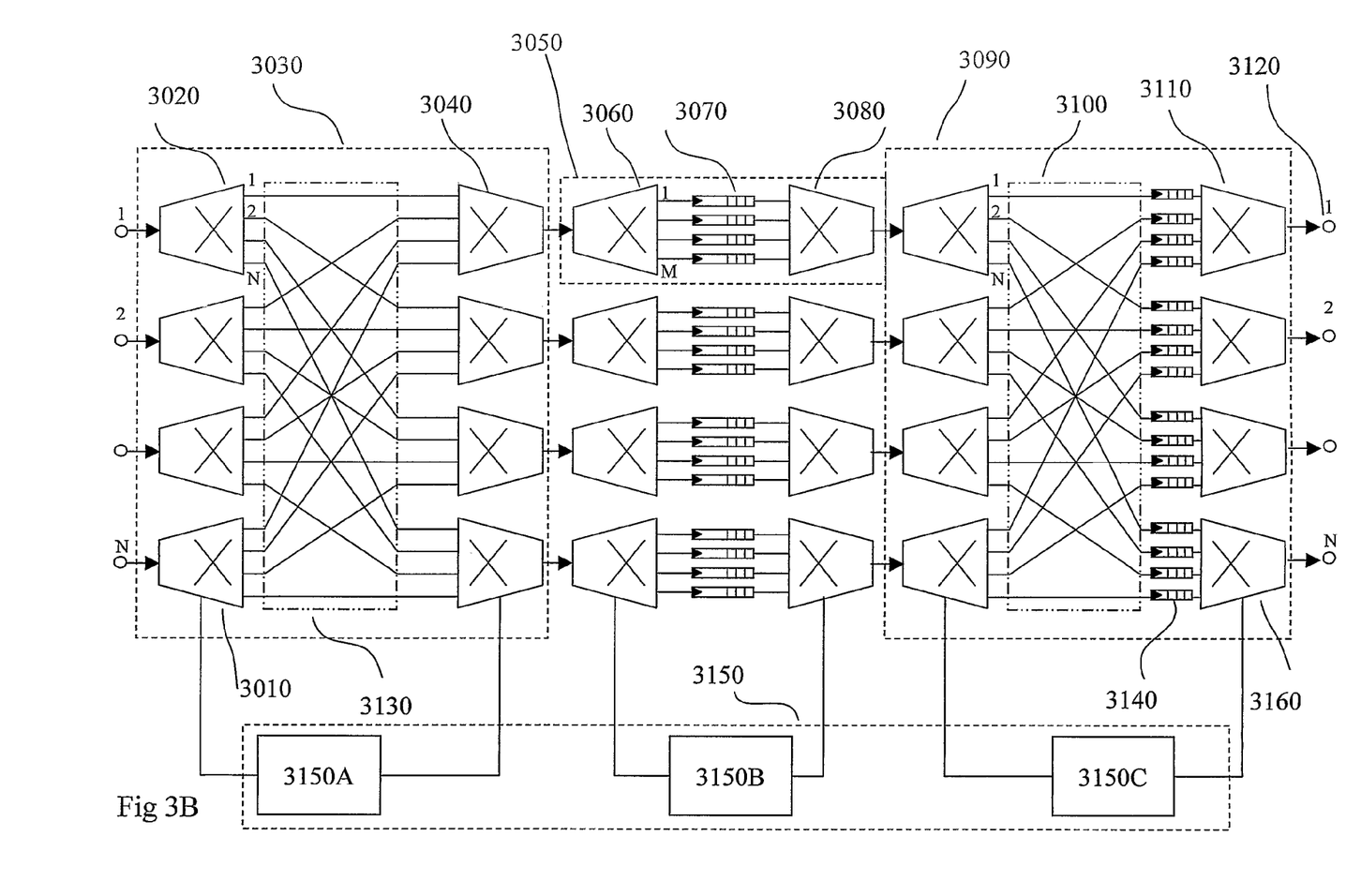
FIG. 3B illustrates a second embodiment of the invention wherein the load-balanced switch is implemented with an output queued crossbar switch and has the routing controller segmented with a control segment per switching stage.

Referring to FIG. 3B, the exemplary first embodiment is again shown in the form of a compact load balanced crossbar packet switch but now with queued output ports. Hence, when the packet of data is routed through the first switch matrix 3030 it passes through the 1:N distribution switches 3020, a perfect shuffle 3130, and N:1 concentrator switches 3040. It is when routed via the third switch matrix 3090 that the packet of data passes through the 1:N distribution switches 3100, the second perfect shuffle 3140, the memory queues 3160 and N:1 concentrator switches 3110.

Alternatively, the first stage switching matrix 3030 and the third stage switching matrix 3090 are implemented with different matrix design architectures which optionally include memory queues in one or the other.

Additionally the packet switching controller 3150 is shown as three control sections 3150A, 3150B and 3150C each of which interfaces to a switch stage of the switching node as well as communicating with each other to provide overall control of the node. Alternatively, two controller sections are optionally combined if the switching matrices are located making such combination beneficial.

Figure 4A:
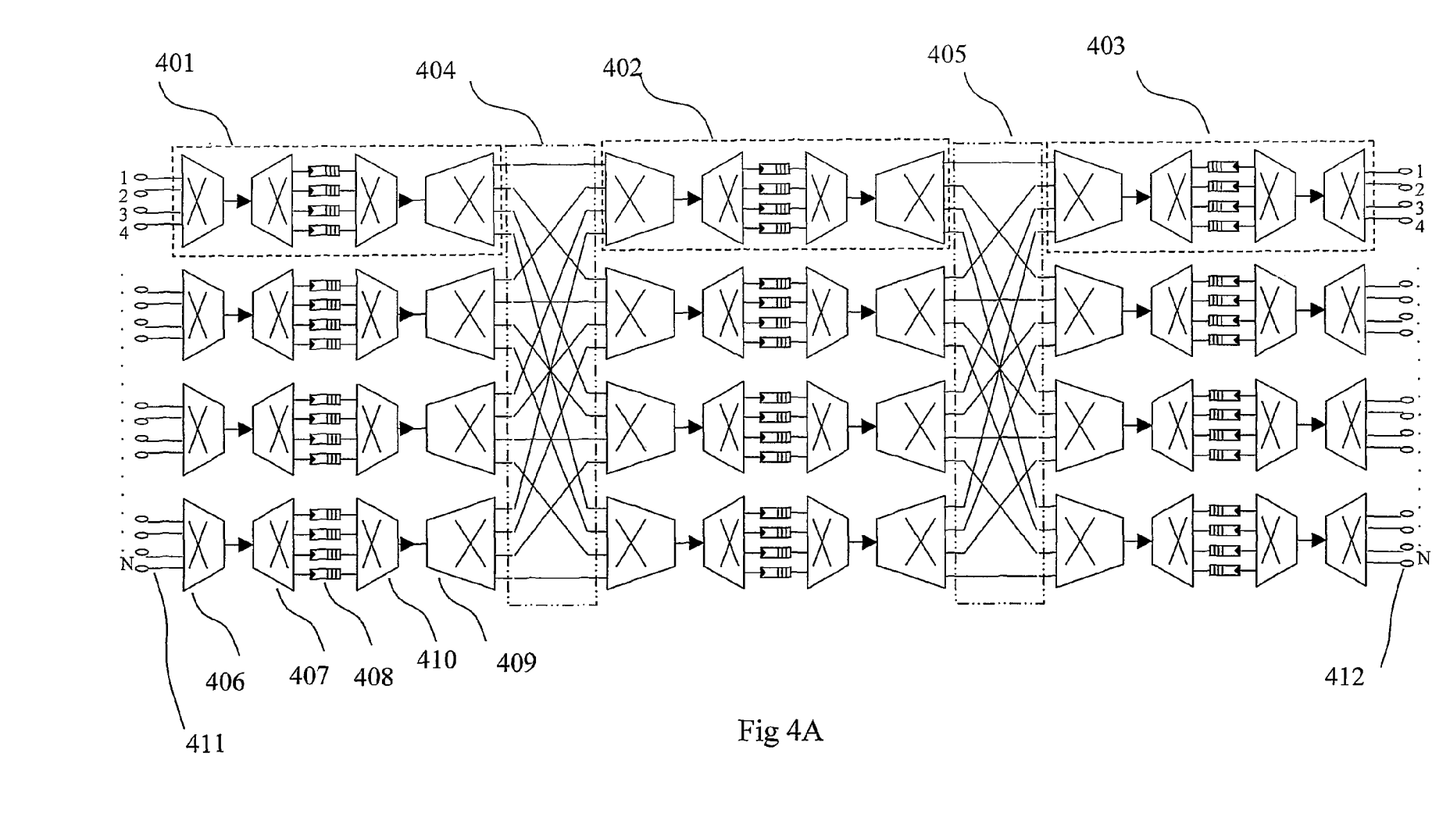
FIG. 4A illustrates a third embodiment of the invention wherein the load-balanced switch is implemented in a manner mimicking a three stage Clos fabric where the external links operate at the same speed as the internal links.

Referring to FIG. 4A, a simplified architectural diagram of a second embodiment of the invention is shown in the form of a compact load balanced three stage Clos network wherein the Clos stages operate at a same line data rate as an input port and an output port. Here a packet of data is incident at one of N input ports 411 of a packet switching node. A header of the packet of data is read and communicated to a packet switching node controller (not shown) which defines a routing of the packet through the node. The packet switching node controller communicates the routing data to a first stage switch matrix 401 comprising a first concentrator switch 406, a first memory switch element comprising a first distribution switch 407, a plurality of first memory queues 408 and a first concentrator switch 409.

From the output port of the first concentrator switch 409, the packet of data is routed to a second distribution switch 410 which feeds the packet of data forward to a first perfect shuffle network 404. In use, the first switching stage 401 performs a grooming of packets to sequence them and route them to a second stage switch matrix 402.

Within the second stage switch matrix 402, the packet of data is again shuffled with other arriving packets and stored within memory queues awaiting transport to a third switch stage. The second stage switch matrix 402 feeds the packet of data forward to a second perfect shuffle network 405.

After being routed through the perfect shuffle 405, the packet of data arrives at the third switch stage and enters a third stage switch 403. Here the packet of data is again sequenced with other arriving packets to create output data streams stored within memory queues awaiting transport to the communications network. The third stage switch 403 feeds the packet of data forward to an output port 412 of the switching node.

Figure 4B:
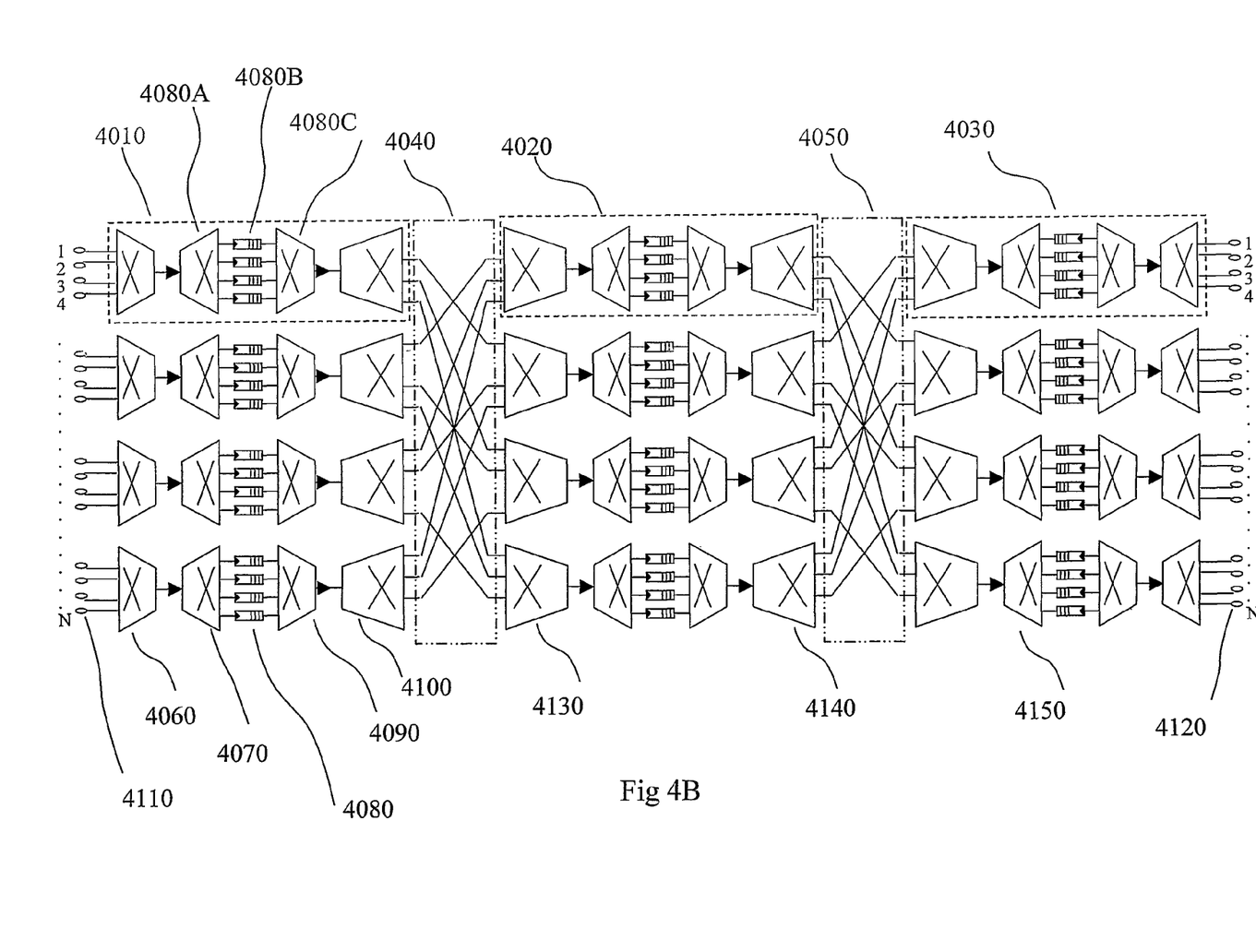
FIG. 4B illustrates a fourth embodiment of the invention wherein the load-balanced switch is implemented in a manner mimicking a three stage Clos fabric but wherein the switch matrices and shuffle networks are reduced functionality.

Referring to FIG. 4B, an alternate embodiment of the compact load balanced three stage Clos network, wherein the Clos stages operate at a same line data rate as an input port and an output port, but exploits switching elements with reduced complexity. As the packet switch algorithm for the packet switch node controller can be implemented such that it grooms packets of data and routes them such that are grouped according to output port it also possible to adjust the algorithm such that it handles reduced complexity within the first and second shuffle networks.

In FIG. 4B the reduced complexity of the first shuffle network between the first switch stage 4010 and second switch stage 4020 is implemented with 1:(N−1) distribution switches 4100, shuffle network 4040 and (N−1):1 concentrator switches 4130. Similarly the second shuffle network between the second switch stage 4020 and third switch stage 4030 is implemented with 1:(N−1) distribution switches 4140, shuffle network 4050 and (N−1):1 concentrator switches 4150.

Additionally the memory queues 4080 are shown as constructed from three segments in series, 4080A, 4080B and 4080C. Optionally the memory segments may be assigned to store data packets with predetermined associations, these including, but not being limited to, packets destined for adjacent output ports and assigned to a dedicated output stage memory switch, packet data for packets stored within different memory queues which is assigned to a dedicated intermediate memory sector serving those queues, packet data associated with packets with adjacent input ports and assigned to a dedicated input stage memory sector, data fields arranged so as to provide a transposed interconnection between the input and intermediate stages, and data fields arranged so as to provide a transposed interconnection between the intermediate and output stages.

Alternatively to perform similar functionality, the switching matrices 401, 402 and 403 of FIGS. 4A and 4010, 4020, and 4030 of FIG. 4B is implemented with different matrix architectures and/or design, optionally including memory queues.

Figure 5:
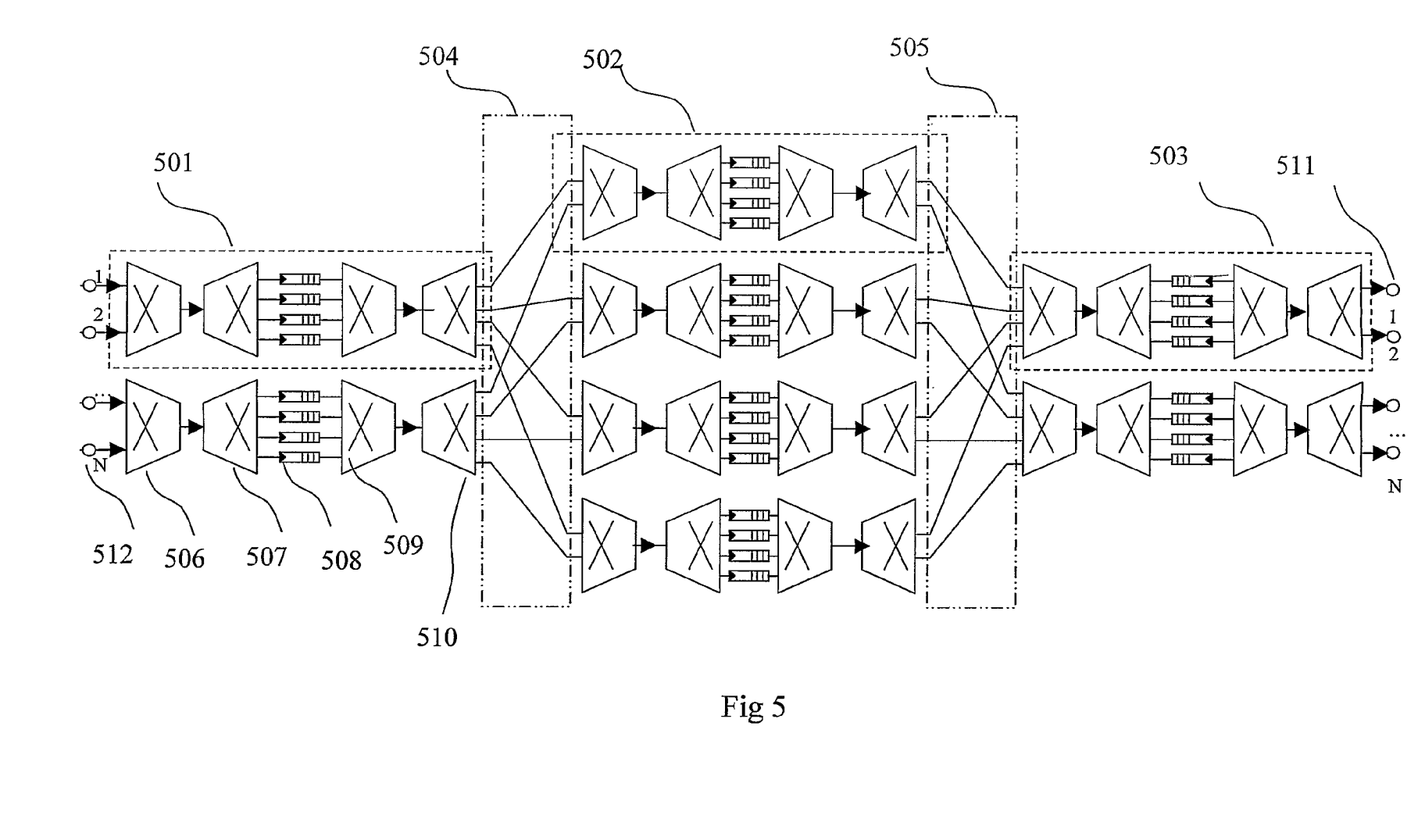
FIG. 5 illustrates a fifth embodiment of the invention wherein the load balanced switch is implemented in a manner mimicking a three stage Clos fabric where the external links operate at the twice the speed of the internal links.

Now referring to FIG. 5, a simplified architectural diagram of a third embodiment of the invention is shown in the form of a compact load balanced three stage Clos network wherein the Clos stages operate at half the data rate of an input port and an output port. A packet of data arrives at one of N input ports 512 of a packet switching node. A header of the packet of data is read and communicated to a packet switching node controller (not shown), which determines routing for the packet through the node. The packet switching node controller communicates routing data to a first stage switch matrix 501, which comprises a first concentrator switch 506, a first memory switch element comprising a first distribution switch 507, a plurality of memory queues 508 and a first concentrator switch 509.

From the output port of the first concentrator switch 509, the packet of data is routed to a second distribution switch 510 which feeds the packet of data forward to a first perfect shuffle network 504. In use, the first switching stage 501 performs a grooming of packets to sequence them and route them to a second stage switch matrix 502.

Within the second stage switch matrix 502 the packet of data is again shuffled with other arriving packets and stored within memory queues awaiting transport to a third switch stage. The second stage switch matrix 502 feeds the packet of data forward to a second perfect shuffle network 505.

After being routed through the perfect shuffle 505, the packet of data arrives at the third switch stage and enters a third stage switch 503. Here the packet of data is again sequenced with other arriving packets to create output data streams stored within memory queues awaiting transport to the communications network. The third stage switch 503 feeds the packet of data forward to an output port 511 of the switching node.

Alternatively to perform similar functionality, the switching matrices 501, 502 and 503 are implemented with different matrix architectures and/or design, optionally including include memory queues.

Advantageously, in the embodiment of FIG. 5, the core switching fabric operates with a substantially lower frequency thereby facilitating implementation of this switching fabric.

As described in the embodiments of the invention with reference to FIGS. 3 through 5 the switching matrices are depicted as spatial switches operating on timescales relatively long. However, in alternate embodiments of the invention the switch matrices may be implemented with devices which operate at high speed and can be reconfigured as required for each and every time slot associated with a packet of data. Such matrices are usually referred to as time division multiplexing switch (TDM switches).

Within the embodiments outlined the multiple stages of memory switching can further be operated synchronously or asynchronously. With an asynchronous approach to a switching node the multiple stages of the switching node can be distributed with each one of the plurality of switching stages under localised clock control. In this the shuffle networks would be transmission links rather than local interconnections.

In respect of the technology used to implement the invention the architecture is independent and can be equally photonics or electronic but may be weighted by their specific tradeoffs. Generally photonic switches are suited to smaller switching fabrics supporting very high throughput with typically limited memory queuing, whilst electronic switches support queues which hold for long periods of time, large fabrics but tend to suffer at supporting high speed as the conventional silicon platform is firstly replaced with silicon-germanium or gallium arsenide which have fewer design options for the building blocks of the switching node.

In respect of the packet switching node controller this may be implemented optionally to include polling elements, allowing the controller to provide additional control of the spatially separated memory switches such that they can be considered in operation as a single large switch matrix.

Numerous other embodiments may be envisaged without departing from the spirit or scope of the invention.

What is claimed is:

1. A switching node comprising:
    a plurality of input ports for receiving data packets;
    a plurality of output ports for providing output data from the switching node;
    a switching fabric for routing the data packets received over the plurality of input ports to the plurality of output ports as output data, wherein the switching fabric routes a first packet flow of first data packets, received at a first input port and destined for a first output port, into a plurality of packet subflows through the switching fabric, wherein the first data packets of the first packet flow have a first packet flow sequence, wherein the switching fabric routes each first data packet into each packet subflow of the plurality of packet subflows according to a distribution sequence; and
    at least one memory switch comprising a plurality of memory queues coupled for storing of packet data therein, for each packet subflow:
        the switching fabric routing to a respective memory queue for temporary storage, first data packets which have been routed into the packet subflow and other data packets comprising:
            data packets received over at least one other input port different from the first input port; and
            data packets destined for at least one other output port different from the first output port,
        the switching fabric routing the first data packets of other packet subflows different from the packet subflow away from the respective memory queue,
    wherein the switching fabric combines first data packets of each packet subflow, after temporary storage within the at least one memory switch, with use of the distribution sequence to reconstruct the first packet flow comprising the first data packets in the first packet flow sequence, and
    wherein the switching fabric routes a recombined packet flow of first data packets of the first packet flow after reconstruction, into a plurality of second packet subflows, the switching fabric routing each first data packet into each second packet subflow of the plurality of second packet subflows according to a second distribution sequence, wherein the at least one memory switch comprises a second plurality of memory queues coupled for storing of packet data therein, and for each second packet subflow:
        the switching fabric routing to a second respective memory queue for temporary storage, first data packets which have been routed into the second packet subflow and second other data packets comprising:
            data packets received over at least one other input port different from the first input port; and
            data packets destined for at least one other output port different from the first output port,
        the switching fabric routing the first data packets of other second packet subflows different from the second packet subflow away from the respective second memory queue,
    wherein the switching fabric combines first data packets of each second packet subflow, after further temporary storage within the at least one memory switch, with use of the second distribution sequence to reconstruct the recombined packet flow comprising the first data packets in the first packet flow sequence.

2. A switching node according to claim 1 wherein the switching fabric routes from the first input port to the first output port each packet of the packet flow through correspondingly similar groups of components each comprising a same number of switches and a same number of memory queues.

3. A switching node according to claim 1 wherein for each packet subflow the switching fabric routes said other data packets to the respective memory queue for temporary storage with said first data packets which have been routed into the packet subflow to provide load balancing within the switching node.

4. A switching node according to claim 1 wherein for each second packet subflow the switching fabric routes said second other data packets to the respective memory queue for temporary storage with said first data packets which have been routed into the packet subflow to provide load balancing within the switching node.

5. A switching node comprising:
    a plurality of input ports for receiving data packets;
    a plurality of output ports for providing output data from the switching node;
    a switching fabric for routing the data packets received over the plurality of input ports to the plurality of output ports as output data, wherein the switching fabric routes for each input port-output port pair:
        a respective packet flow of data packets, received at the input port of the pair and destined for the output port of the pair, into a respective plurality of packet subflows through the switching fabric, wherein the data packets of the respective packet flow have a respective packet flow sequence, wherein the switching fabric routes each data packet of the respective packet flow into each packet subflow of the respective plurality of packet subflows of the respective packet flow according to a respective distribution sequence; and
    at least one memory switch comprising a plurality of memory queues coupled for storing of packet data therein:
        the switching fabric, for each respective packet subflow of the respective plurality of packet subflows, routing to a respective memory queue for temporary storage:
            the data packets of the respective packet flow which have been routed into the respective packet subflow and other data packets comprising:
                data packets received over at least one other input port different from the input port of the pair for which the switching fabric routes the respective packet flow; and data packets destined for at least one other output port different from the output port of the pair for which the switching fabric routes the respective packet flow, the switching fabric routing the data packets of other packet subflows of the respective plurality of packet subflows which are other than the packet subflow of the respective packet subflow away from the respective memory queue, wherein, for each pair, the switching fabric combines data packets of each packet subflow of the respective plurality of packet subflows, after temporary storage within the at least one memory switch, with use of the respective distribution sequence to reconstruct the respective packet flow comprising the data packets in the respective packet flow sequence, and wherein the switching fabric routes a recombined packet flow of data packets of the respective packet flow after reconstruction, into a respective plurality of second packet subflows, the switching fabric routing each data packet of the respective packet flow into each respective second packet subflow of the respective plurality of second packet subflows according to a second respective distribution sequence, wherein the at least one memory switch comprises a second plurality of memory queues coupled for storing of packet data therein, and for each respective second packet subflow:

the switching fabric routing to a second respective memory queue for temporary storage, data packets of the respective packet flow which have been routed into the respective second packet subflow and second other data packets comprising:

data packets of the respective packet flow received over at least one other input port different from the input port of the pair for which the switching fabric routes the respective packet flow; and data packets of the respective packet flow destined for at least one other output port different from the output port of the pair for which the switching fabric routes the respective packet flow, the switching fabric routing the data packets of other second packet subflows of the respective packet flow different from the second packet subflow of the respective packet flow away from the respective second memory queue, wherein the switching fabric combines data packets of each second packet subflow, after further temporary storage within the at least one memory switch, with use of the second respective distribution sequence to reconstruct the recombined packet flow comprising the data packets of the respective packet flow in the respective packet flow sequence.

6. A switching node according to claim 5 wherein for each respective packet subflow the switching fabric routes said other data packets to the respective memory queue for temporary storage with said first data packets which have been routed into the respective packet subflow to provide load balancing within the switching node.

* * * * *